Patented Mar. 25, 1941

2,236,296

UNITED STATES PATENT OFFICE 2,236,296

WETTING AND DISPERSING AGENT

Arthur Minich, Irvington, and Herman Levinson, Elizabeth, N. J., assignors to Nuodex Products Co., Inc., a corporation of New York No Drawing. Application March 16, 1938,
Serial No. 196,150

2 Claims. (Cl. 134—57)

This invention relates to wetting and dispersing agents for use in connection with paints, varnishes, lacquers, enamels and other coloring and coating materials and driers and other components thereof.

We have discovered, as a result of long experimentation and research, that certain salts of organic acids, such as naphthenates, resinates, linoleates, benzoates, citrates, furoates, tartrates, isopropyl - methyl - endoethylene - tetrahydro phthalates, and oleates, produce very satisfactory wetting and dispersing agents for the purposes stated. The wetting and dispersing agents of this invention, as hereinafter more fully defined, are produced by compounding water-soluble and water-insoluble salts of one or more of such organic acids.

By salts of organic acids we refer to a group of substances produced by replacing the acidic negative hydrogen of an acid by an electro positive element or group, or to state the matter in another way, that group of substances which result from the reaction between acids and acid neutralizers or a compound of a metal or positive radical and a non-metal or negative radical.

The water-soluble constituent of the wetting and dispersing agent of this invention represents salts of one or more of the acids selected from the group stated, and sodium, potassium, lithium or ammonium.

The water-insoluble salt of the present invention is a salt of one or more of such acids and a metal selected from the group cobalt, manganese, lead, zinc, nickel, iron, mercury, copper, barium, cadmium, calcium, chromium, cerium, magnesium, strontium and tin, or such water-insoluble salt may be an alkyl salt of one or more of such acids and any alcohol, such, for example, as ethyl, methyl, butyl, propyl, amyl, glycol, glycerine.

We have discovered that, when these water-soluble and water-insoluble salts are used together in composite, they behave differently than when either water-soluble or water-insoluble salts are individually employed and bring about entirely unexpected results. When used in combination, they produce a composition which is soluble in paint and varnish vehicles. They do not increase the viscosity thereof or tend to stiffen or increase the body of the coating materials to which they are added. On the contrary they tend to render coating mediums more fluid. For example, we have found that, if a sodium naphthenate and a lead naphthenate are compounded, the resulting compound is soluble in mineral spirits and that a solution thereof will serve as a very effectual wetting and dispersing agent for pigments, paints, lacquers, etc., aside from which this composition also possesses certain drying functions which are advantageous when used in this connection. It is also found that the composition does not tend to stiffen or lend body to such coating materials. It has the tendency to reduce settling and to lower the oil absorption of pigments and it does not tend to increase the viscosity of coating mediums, but rather tends to render them more fluid. When used in coating mediums employing mineral spirits as a thinner, the composition has been found to be soluble therein.

Similar results have been found to prevail when we compounded sodium naphthenate with naphthenates of zinc, cobalt, manganese, iron, copper, mercury, calcium, barium or nickel.

Other experiments have demonstrated that the soluble salts of appropriate acids, above referred to, will satisfactorily cooperate with the insoluble salts of appropriate acids to give the results desired, but care should be taken in the choice of the acids used in producing the soluble and insoluble salts to the end that a homogeneous solution will result from the blending of the water-soluble and water-insoluble salts referred to.

Other tests by us have demonstrated that satisfactory results are obtained by combining ammonium naphthenate (water-soluble) with butyl naphthenate (water-insoluble). As in the previous examples, the composition did not tend to stiffen or lend body to the coating materials, but, on the contrary rendered them more fluid.

In the course of our experimentation we tested aluminum naphthenate with several water-soluble naphthenate salts, including sodium naphthenate, and observed the phenomenon that this particular combination had a pronounced and permanent bodying effect upon all sorts of oils, including mineral oils and we have employed this information in the making of this combination to be used as a bodying agent for paints or other coating materials. From this it appears that such a combination has no place in this invention and should not be used in this connection as it tends to defeat the very purposes to which the present invention is directed. The salts of the other metals referred to have been found to give highly satisfactory results for the purposes stated.

As to the choice of acids, reference has been made to the necessity of producing a homogeneous solution when the soluble and insoluble salts are combined. We shall not attempt to give examples of all the combinations that we have found satisfactory in this connection, as the choice of the proper acid will be clear to those skilled in the art from this description.

It is found that, when the aforesaid water-insoluble and water-soluble salts are combined, one of these salts being insoluble in mineral spirits, the combination is wholly soluble in mineral spirits and our experience has shown that the resulting compounds have very pronounced wetting and dispersing action upon pigments and many other coating materials. For example, it is known that, if a solution of lead naphthenate and mineral spirits, carrying, e. g., 24 per cent lead metal in the form of lead naphthenate, is incorporated in certain common varnishes, such as varnishes carrying raw linseed oil, the varnish will remain clear for a relatively short time and will thereafter become cloudy and accumulate sludge, showing that some of the lead has precipitated out in the form of insoluble compounds. However, we have found that a mineral spirit solution of a compound containing, for example, 24 per cent lead in the form of lead naphthenate, with as little as one-half per cent sodium in the form of sodium naphthenate, when introduced in said varnish, will cause the varnish to remain clear for prolonged periods with no appreciable precipitation.

We have referred specifically to the combining of one water-soluble derivative of an organic acid with one water-insoluble derivative of the same or different acid but, if desired, a plurality of either one or the other of these derivatives may be employed as, e. g., a lead and cobalt on the one hand and sodium and potassium on the other hand. By way of further example the composition may comprise cobalt and manganese naphthenates as the water-insoluble derivatives and sodium naphthenate as the water-soluble derivative.

We have also found that the conjoint use of zinc naphthenate with potassium naphthenate greatly facilitates wetting and grinding of pigments.

We have also found that the present invention may be employed as a dispersing or wetting or color intensifying agent as will be hereinafter more fully explained.

The field of use of this invention is so comprehensive that it is not practical to specify all the ways in which these various derivatives may be compounded and used. However, the following examples will suffice as indicative:

*Lead drier*

To 2800 pounds of naphthenic acid, maintained at a temperature of 220°–240° F., 85 pounds of a 75% aqueous solution of caustic soda is slowly added with agitation. When the water has been driven off, 2000 pounds of litharge is gradually added and the mixture kept at 220°–240° F. until all the litharge is reacted and the water of reaction is driven off. The complex lead-sodium naphthenate thus formed is diluted with 3000 pounds of mineral spirits to a concentration of 24% lead and ½% sodium. This solution is readily soluble in raw linseed oil, forming a solution that remains clear for long periods.

An alternate mode of preparation is as follows:

To 3500 pounds of lead naphthenate containing 32% lead metal and maintained in a molten condition, there is added 220 pounds of sodium naphthenate. The molten mixture is stirred until homogeneous and then diluted with 940 pounds of mineral spirits to give 4660 pounds of a solution containing 24% lead and ½% sodium.

*Wetting agent for paints and enamels*

170 pounds of 80% aqueous caustic potash solution is slowly added to 2350 pounds of naphthenic acid, the temperature being maintained at 220°–240° F. After most of the water is driven off, 295 pounds of zinc oxide is gradually added with agitation and the mixture maintained at a temperature of about 240° F. until a clear homogeneous mixture results. By this method we obtain 2750 pounds of a zinc potassium naphthenate combination containing 8.6% zinc on a metallic basis and 3.45% potassium. The increased polarity caused by the potassium naphthenate material enhances the wetting and dispersing properties of this compound particularly when used in paints and enamels.

*Intensifying agent*

780 pounds of naphthenic acid (acid number 230) were heated to 180° F. Then there was introduced 1 pound of ammonium acetate crystals. The temperature was then permitted to rise to about 200° F. and under constant agitation 2 pounds of lithium carbonate were introduced. This was followed by the addition of 64½ pounds barium hydroxide. The temperature was then increased to approximately 220° F. and under continued stirring 111 pounds of zinc oxide was then introduced. Then there was added 8 pounds of hydrogen peroxide (100 volume strength), but this may be omitted. The temperature was gradually raised to 240° F. and held for approximately 1 hour. The reaction at the end of this time was completed and there was then added to the resulting chemical compound 221 pounds of a mineral oil known to the printing trade as an ink mineral oil. A clear and homogeneous solution was thereby produced. This product was found to possess outstanding merit when used in conjunction with certain printing inks, more particularly black inks wherein it has been the practice to add a quantity of organic blue toners. By the use of relatively small quantities of the product which we have described, in inks of this character, it was possible to materially decrease the quantity of blue toners required. In one case it was found practical to decrease the necessary amount of methyl violet blue toner to 25% of the quantity theretofore found necessary. These toners are highly expensive as compared with the product which we have described and made in accordance with the present invention, so that through their employment marked economies are possible and the working properties of such inks are improved.

It will be noted in the foregoing example that the lithium naphthenate is the water-soluble constituent and, per se, is insoluble in the ink oil vehicle, while the barium and zinc naphthenates constitute the water-insoluble constituents and are, per se, soluble in the ink oils. It is notable, however, that when they are used conjointly as stated, both are completely soluble in the ink oil which is used as the vehicle.

We have referred to an acid number of 230 in conjunction with the naphthenic acid employed in the foregoing example, but acids of other acid numbers may be employed if desired, depending upon the character of the product desired.

We have found lithium and barium to give very satisfactory results when used with zinc in this example, but we may, if desired, use the combination of any of the other metals referred to without departing from this invention.

*Dispensing agent for pigments*

To 900 pounds of fused calcium naphthenate containing 4% calcium there is added with stirring, 640 pounds of a 75% aqueous solution of sodium naphthenate. The temperature is kept at 220°–240° F. until all the water has been driven off and the fused mixture is limpid in appearance. The resulting mixture (1380 pounds) contains 65% calcium naphthenate and 35% sodium naphthenate.

*Softening agent for rubber*

To 1635 pounds of naphthenic acid maintained with agitation at a temperature above 220° F., 83 pounds of 80% caustic soda solution is slowly added. Thereafter 205 pounds of zinc oxide is slowly added, the temperature being raised to around 240° F. By this method we obtain 1830 pounds of a homogeneous zinc naphthenate-sodium naphthenate combination containing 9.1% zinc on a metallic basis and 2.1% sodium.

This example is quite interesting as illustrative of the fact that the combination of the water-soluble and water-insoluble constituents, in composite, produces wholly unexpected results. In the reclaiming of rubber, it is advantageous to employ certain softening agents, such, for example, as zinc naphthenate or sodium naphthenate. Neither of these, however, have been used commercially to any great extent because each has its particular limitations which render it unsatisfactory. We have found, however, that by combining these two together, we get highly satisfactory results and pronounced economies due to the interaction between them and the effect which each seems to have upon the other in carrying out the purposes stated. The composition referred to is particularly useful in the making of paints or other coatings which include rubber.

By way of further example, the composition may consist of manganese naphthenate and tributyl citrate as the water-insoluble derivatives and sodium naphthenate as the water-soluble derivative. This combination, when in solution in organic solvents, does not possess any tendency to show gellation or sedimentation and has greatly increased solubility in alkali-refined linseed oil.

As a further example, we have compounded lead naphthenate and lead isopropyl-methyl-endoethylene-tetrahydro phthalate as water-insoluble derivative with sodium naphthenate as the water-soluble derivative to produce a highly soluble and effective drier for paints and varnishes.

The foregoing examples relates to the employment of the invention in connection with the naphthenates as derivatives of naphthenic acid. We are also aware that the invention is susceptible of use in connection with derivatives of organic acids other than naphthenic acid. For example, it is a well known fact that solutions of fused lead resinate in organic solvents tend, on storage, to deposit out a granular sediment. We have found that, by combining a relatively small quantity of a water-soluble derivative of an organic acid, such as morpholine linoleate in solution with lead resinate, its tendency toward sedimentation is greatly minimized and rendered negligible.

It will be noted from the foregoing that we have referred to the water-soluble naphthenates and the water-insoluble naphthenates, these two constituting well defined classes which are readily recognizable as such, but which have well defined characteristics each as distinguished from the other. For example, all the water-insoluble naphthenate salts possess considerable solubility in organic solvents, such as mineral spirits. The water-soluble naphthenate salts, on the other hand, are distinguished by the substantial lack of solvency in organic solvents, such as mineral spirits. The water-soluble naphthenate salts in general are substantially insoluble in organic solvents used in surface coating compositions. As a further characteristic of the water-soluble naphthenate salts, it may be stated that they all hydrolyze to a considerable degree under the effect of water. In contrast thereto the water-insoluble naphthenate salts are very resistant to hydrolysis. It is by virtue of these facts and in order to establish definite classes to which the present invention relates and which are combined in the manner stated they are generally spoken of as water-soluble and water-insoluble derivatives of an organic acid.

It will be noted that in the foregoing specification the water-insoluble constituent of this invention is in fact a neutralization product of the interaction between an organic acid with an acid-neutralizer selected from the group comprising cobalt, manganese, lead, zinc, nickel, iron, mercury, copper, barium, cadmium, calcium, chromium, cerium, magnesium, strontium and tin. These agents are all acid neutralizers for neutralization is scientifically and technically understood as the process of replacing the acidic hydrogen of any acid by an electro positive element or alkyl groups. (Hackh, "A Chemical Dictionary," Blakeston, 1929, page 490, neutralization. "A Chemical Age," Chemical Dictionary, London, Ernest Benn, Ltd., 1924, page 135).

The salts which applicants employ including the esters referred to (Hackh, "A Chemical Dictionary," supra, pages 646 and 277. Kingzett, Chemical Encyclopedia, Van Nostrand, 1932, page 318) are in fact neutralization products of the acids and their neutralizing agents which have been referred to and the claims should be read with this in mind.

In consideration of these matters certain of the naphthenate salts hereinbefore referred to have been stated to be insoluble. By this we mean that they are substantially insoluble for all practical purposes.

In carrying out the present invention, the compounds which we employ may be neutral, although in some instances we may, if desired, add small quantities of free acid, preferably naphthenic acid. For example, in connection with driers we have found that manganese linoleate together with triethanolamine naphthenate together with a small amount of free naphthenic acid produces a solution, in organic solvents, which has remarkable solubility in drying oils and varnish vehicles.

It is thus apparent from the foregoing that the use of water-soluble and water-insoluble salts of the same or different acids in combination will in many cases produce results much superior to the use of either independently and while the examples given are typical they are not intended to be of a limiting nature as the invention is adapted to quite widespread application in the arts.

According to the present invention a plurality of water-soluble and water-insoluble salts of the same or different organic acids, so selected that they are capable of yielding a homogeneous solution, are compounded either by themselves and subsequently introduced into the vehicle or material into which they are to be incorporated or they may be introduced separately or in succession into such vehicle or material and in quantities of each as may be dictated by the particular uses for which they are to be applied.

It is to be understood that the choice of these water-insoluble or water-soluble organic or inorganic salts of the organic acid or acids may be made in desired combinations as required to fit particular needs, the fundamental concept being that at least two or more, at least one of which is water-soluble and at least one of which is water-insoluble, are employed in the combination, and all of which are compatible with each other so as to yield a homogeneous solution.

Throughout the foregoing detailed description we have dealt with the conjoint use of water-soluble and water-insoluble salts of organic acids. During our research in connection with these matters, certain tests demonstrated that it was possible in some cases and for some uses to employ in combination a metallic salt with an alkyl salt of the organic acid, both of them being water-insoluble. This combination was highly useful as a softening and dispersing agent for rubber. Examples of tests made in this connection are as follows:

For example, a composition of 30 pounds of solid zinc naphthenate, when dissolved in 50 pounds of butyl naphthenate, produces a solution which is a powerful softening and dispersing agent for rubber.

We have also found that excellent results were obtained in some cases if a water-soluble salt of an acid were compounded with a water-insoluble organic acid. For example, by compounding sodium naphthenate and linoleic acid we have obtained a composition that is an excellent dispersing and peptizing agent and one which materially eliminates the settling of pigments.

We have also compounded, for the same uses, sodium naphthenate and naphthenic acid, and likewise triethanolamine napthenate and isopropyl-methyl-endoethylene-tetrahydro phthalic acid.

Having thus fully described the invention, what we claim as new and desire to secure by Letters Patent is:

1. A modifying composition for paints, varnishes, lacquers, enamels, inks and pigments consisting of a non-aqueous homogeneous solution of at least one substantially water-insoluble neutralization product and at least one substantially water-soluble neutralization product, the water-insoluble neutralization product being formed by the interaction of at least one acid selected from the group consisting of naphthenic acid, linoleic acid, oleic acid, abietic acid, benzoic acid, furoic acid, salicylic acid, isopropyl-methyl-endoethylene-tetrahydro phthalic acid, with at least one acid neutralizing agent selected from the group consisting of cobalt, manganese, lead, nickel, iron, mercury, copper, zinc, barium, cadmium, calcium, chromium, cerium, magnesium, strontium and tin, and the water-soluble neutralization product being formed by the interaction of at least one acid selected from the group consisting of naphthenic acid, linoleic acid, oleic acid and abietic acid, with at least one acid neutralizing agent selected from the group consisting of sodium, potassium, lithium and ammonium.

2. A drier for paints, varnishes, enamels, inks and pigments consisting of a non-aqueous homogeneous solution of at least one substantially water-insoluble neutralization product and at least one substantially water-soluble neutralization product, the water-insoluble neutralization product being formed by the interaction of at least one acid selected from the group consisting of naphthenic acid, linoleic acid, oleic acid, abietic acid, benzoic acid, furoic acid, salicylic acid, isopropyl-methyl-endoethylene-tetrahydro phthalic acid, with at least one acid neutralizing agent selected from the group consisting of cobalt, manganese, lead, nickel, iron, mercury, copper, zinc, barium, cadmium, calcium, chromium, cerium, magnesium, strontium and tin, and the water-soluble neutralization product being formed by the interaction of at least one acid selected from the group consisting of naphthenic acid, linoleic acid, oleic acid and abietic acid, with at least one acid neutralizing agent selected from the group consisting of sodium, potassium, lithium and ammonium.

ARTHUR MINICH.
HERMAN LEVINSON.